US009626513B1

(12) United States Patent
Aytek et al.

(10) Patent No.: US 9,626,513 B1
(45) Date of Patent: Apr. 18, 2017

(54) TRUSTED MODULAR FIRMWARE UPDATE USING DIGITAL CERTIFICATE

(71) Applicant: MARVELL INTERNATIONAL LTD., Hamilton (BM)

(72) Inventors: Tolga Aytek, Framingham, MA (US); Joseph Jolicoeur, Uxbridge, MA (US); Minda Zhang, Westford, MA (US)

(73) Assignee: Marvell International Ltd., Hamilton (BM)

( * ) Notice: Subject to any disclaimer, the term of this patent is extended or adjusted under 35 U.S.C. 154(b) by 231 days.

(21) Appl. No.: 14/052,940

(22) Filed: Oct. 14, 2013

Related U.S. Application Data

(63) Continuation of application No. 12/108,910, filed on Apr. 24, 2008, now Pat. No. 8,560,823.

(60) Provisional application No. 60/946,490, filed on Jun. 27, 2007, provisional application No. 60/913,624, filed on Apr. 24, 2007.

(51) Int. Cl.
*G06F 21/57* (2013.01)
*H04L 29/06* (2006.01)

(52) U.S. Cl.
CPC ........ *G06F 21/572* (2013.01); *H04L 63/0823* (2013.01)

(58) Field of Classification Search
CPC ... G06F 21/575; G06F 21/572; H04L 63/0823
See application file for complete search history.

(56) References Cited

U.S. PATENT DOCUMENTS

| | | | |
|---|---|---|---|
| 6,263,431 B1 | 7/2001 | Lovelace et al. | |
| 6,560,706 B1 | 5/2003 | Carbajal et al. | |
| 7,934,049 B2 | 4/2011 | Holtzman et al. | |
| 8,560,823 B1 | 10/2013 | Aytek et al. | |
| 2004/0025010 A1* | 2/2004 | Azema | G06F 21/10 713/156 |
| 2005/0005098 A1 | 1/2005 | Michaelis et al. | |
| 2005/0021968 A1* | 1/2005 | Zimmer | G06F 21/572 713/176 |

(Continued)

OTHER PUBLICATIONS

Housley et al.; RFC 2459—Internet X.509 Public Key Infrastructure Certificate and CRL Profile; 1999; Retrieved from the Internet <URL:.ietf.org/rfc/rfc2459.txt.pdf>; pp. 1-129 as printed.*

(Continued)

*Primary Examiner* — Oleg Korsak

(57) ABSTRACT

An electronic device includes a boot memory, a hardware memory programmed with a signing key, and a processor configured to implement a fixed trusted module and a dynamic trusted image module. The fixed trusted module contains a digital certificate, which includes a platform key used to verify a first boot module, and a package verification key used to validate authenticity of an image update file. The dynamic trusted image module contains a platform certificate signed by the signing key. The platform certificate includes a platform verification key used to validate at least one of (i) a second boot module, (ii) an operating system loader, (iii) an operating system, or (iv) a file system. The platform certificate also includes image information associated with one or more images stored in the platform certificate, key information associated with one or more public keys, and electronic device-specific data.

17 Claims, 10 Drawing Sheets

(56) References Cited

U.S. PATENT DOCUMENTS

| | | |
|---|---|---|
| 2005/0138409 A1 | 6/2005 | Sheriff et al. |
| 2005/0154898 A1 | 7/2005 | Chao |
| 2006/0174240 A1* | 8/2006 | Flynn .................... G06F 9/4406 717/170 |
| 2007/0061570 A1 | 3/2007 | Holtzman et al. |
| 2007/0061897 A1 | 3/2007 | Holtzman et al. |

OTHER PUBLICATIONS

Itoi et al.; Personal Secure Booting; 2001; Retrieved from the Internet <URL: link.springer.com/chapter/10.1007/3-540-47719-5_12#page-1>; pp. 1-15 as printed.*

* cited by examiner

DTIM Certificate Layout

TRUSTED MODULAR FIRMWARE UPDATE USING DIGITAL CERTIFICATE

CROSS-REFERENCE TO RELATED APPLICATION

This application is a divisional of U.S. patent application Ser. No. 12/108,910 (now U.S. Pat. No. 8,560,823), entitled "Trusted Modular Firmware Update Using Digital Certificate" and filed on Apr. 24, 2008, which claims the benefit of U.S. Provisional Application No. 60/946,490, entitled "FOTA with Dynamic Binding" and filed on Jun. 27, 2007, and which also claims the benefit of U.S. Provisional Application No. 60/913,624, entitled "Method and Apparatus Over Trusted Modular Firmware Image Update Via Mobile Network Using Mobile Device Root of Trust and Digital Signature" and filed on Apr. 24, 2007. The entire disclosures of all of the applications identified above are hereby incorporated by reference herein.

DESCRIPTION OF RELATED ART

The memory of an electronic device may contain software or firmware associated with one or more domain owners. For example, a cellular telephone may have a manufacturer's domain for operation of the wireless portion of the cell phone, an operator's domain including a user interface, and perhaps an application domain supporting a custom application.

Each domain may be authenticated either before execution or during a boot cycle of the electronic device using keys provided by the domain owner. However, when a domain needs to be authenticated, the domain owner is dependent on the security of an underlying boot process to correctly authenticate the initial boot load, providing a secure underlying platform.

When each domain starts, an authentication process must be executed to verify the integrity of the software or firmware associated with that domain. Because the firmware for each domain must be individually authenticated by digital signature verification, the activation process may be delayed over several cryptographic operations.

FIG. 1 illustrates an exemplary prior art memory layout 100 for an electronic device. A boot read-only memory (ROM) 102 may be fixed during manufacturing. A wireless trusted module 104 may be part of a trusted environment used to authenticate wireless connections supported by the electronic device and may incorporate separate cryptographic keys (not depicted).

A first security domain may include a first image verification module 106 and a boot module 108 owned by an original equipment manufacturer (OEM) of the device. The first image verification module 106 may include a public key corresponding to a private key held by the OEM. Because the boot module 108 may be signed by the private key, the public key may be used to verify the authenticity of the boot module 108. A binary, that is a digital form of information, software, media, text, etc., that is encrypted with a private key can only be decrypted with a single, corresponding public key. Therefore, if the public key is known to come from the OEM, the correct decryption of an associated encrypted file will verify that binary both came from the authorized party holding the private key and that the binary file has not been altered. In this case, a hash of the boot module 108 taken at the OEM and encrypted with the OEM private key may be decrypted with the OEM public key and compared to a hash of the boot module in local memory. If they match, the boot module 108 may be trusted and operation may continue. The OEM public key is also bound to the specific hardware using one time programmable or fuse-link memory to form a root of trust. This provides the ability to detect an attempt to replace the chain of keys.

One method of measuring a binary is to take a hash of the binary using a hash algorithm, for example, SHA-1, SHA-2, MD5, etc., and encrypting the hash, also known as a message digest, with the private key. During a subsequent verification, the encrypted (or signed) hash may be decrypted with the public key and the result compared to a hash of a binary under test. If the two hashes are identical, the verifying party can be confident that the binary is from the holder of the private key and has not been modified. In FIG. 1, such a measurement is performed by an image verification module.

After verification of the boot module 108, an operating system (OS) loader 110 may be activated by the boot module 108. The OS loader 110 may be used to activate an operating system (OS) 114. At the beginning of the OS activation process, verification of the OS 114 may be performed using a second image verification module 112. The OS 114 may be signed by a developer of the operating system using a corresponding private key. Similar to the first verification process, the second image verification module may take a hash of the OS 114, decrypt the hash of a known good OS image using the OS verification key, and compare the two hashes. If they match, the OS can be trusted and operation may continue.

In this manner, either as part of the boot process or at the time of individual activation, other components of the electronic device may be authenticated and used. As shown in FIG. 1, a third image verification module 116 may validate an application 118 using the process described above and an application verification key from the application provider. The boot module 108, the OS 114, and the application 118 each are part of separate security domains or spheres of trust. Each security domain corresponds to software or firmware covered by different providers, with each provider having their own secret private key. Because each security domain is self-contained, the individual validations must be performed separately.

The file system 120 and mass storage 122 used by the OS 114 and the application 118 may be validated or not depending on the state of the electronic device 100 and the level of trust required.

The separate validation of the individual elements can be time consuming because of the cryptographic operations required. Further, updating any of the elements requires replacing not only the element in question, e.g. the boot module 108, but the associated verification module, e.g. verification module 106, because a new element will not match the old hash stored in the verification module. However, securely replacing an entire security domain can be difficult because the entire security domain must rely on the security of another element (outside its own domain) to perform the replacement.

Replacing the boot-related security domain creates an additional difficulty associated with error handling during the update. For instance, if an error occurs at a critical point, the electronic device may become unbootable and useless.

SUMMARY OF THE DISCLOSURE

An electronic device with a secure boot environment may first authenticate an initial boot routine using a root of security, such as a root or platform key used to verify a hash of the initial boot image. The root key may cover, i.e. protect, a standard boot environment that incorporates initial operating routines from a number of domain owners. When developing the secure boot environment, while still in a trusted environment, each domain owner may submit applications and utilities to be included in a single, secure domain covering a boot module, operating system, applications, etc.

In one embodiment, the root key may authenticate a combined image encompassing a number of images in a single operation during a boot operation. This may save time as compared with individual verifications of each domain. However, applications or updates incorporated after the initial secure manufacturing process cannot be covered by the initial, unified image hash. Any update to an individual element may require separate verification data and creation of a security domain for the subject matter of the update. After a number of updates, the environment may resemble the prior art implementation with multiple security domains.

One exemplary embodiment incorporates a solution using a separate key to sign a hash of an updated, complete image. However, updating the image and then subsequently taking a hash of the updated image may create a risk. If the electronic device crashes or is turned off during the period after the update is installed but before the verification data (including hash) is taken, signed, and installed, the firmware will have a new image, but the hash value will correspond to the old image. Because the current image will calculate one hash value and the stored, signed hash value will correspond to the previous image, the boot process will fail. This can be a fatal failure as the device will not be able to boot far enough to repair the hash to correspond to the new image.

One embodiment avoids this by loading the updated image into a dummy location and the new hash and related verification data is calculated, signed, and stored separately. Then, the image and hash can both be updated in an atomic operation, that is, the update of both the image and the hash must complete successfully, or the image and hash are both restored to their original state.

To limit attempts to subvert the process, another embodiment allows the signing key used to cover (i.e. encrypt) the new hash to only be available in a pre-boot, "update" mode. After successfully signing the new hash and installing the update, the signing key may be deactivated and the update mode may exit, followed by a reboot into a normal operational mode. Because the signing key is only available while in an update-pending mode, potentially malicious user code, applications, etc., are never active when the signing key is exposed.

This embodiment also addresses domain security. During an update, each firmware element may be verified in a one-time operation by a domain-specific verification key prior to installation During the boot cycle, each domain's information (e.g. software, firmware, settings, etc.) is verified once by the common platform key corresponding to the secure signing key.

One embodiment may organize and store the image verification data and key data using a digital certificate format because of its well understood structure.

DETAILED DESCRIPTION

Figure 1:
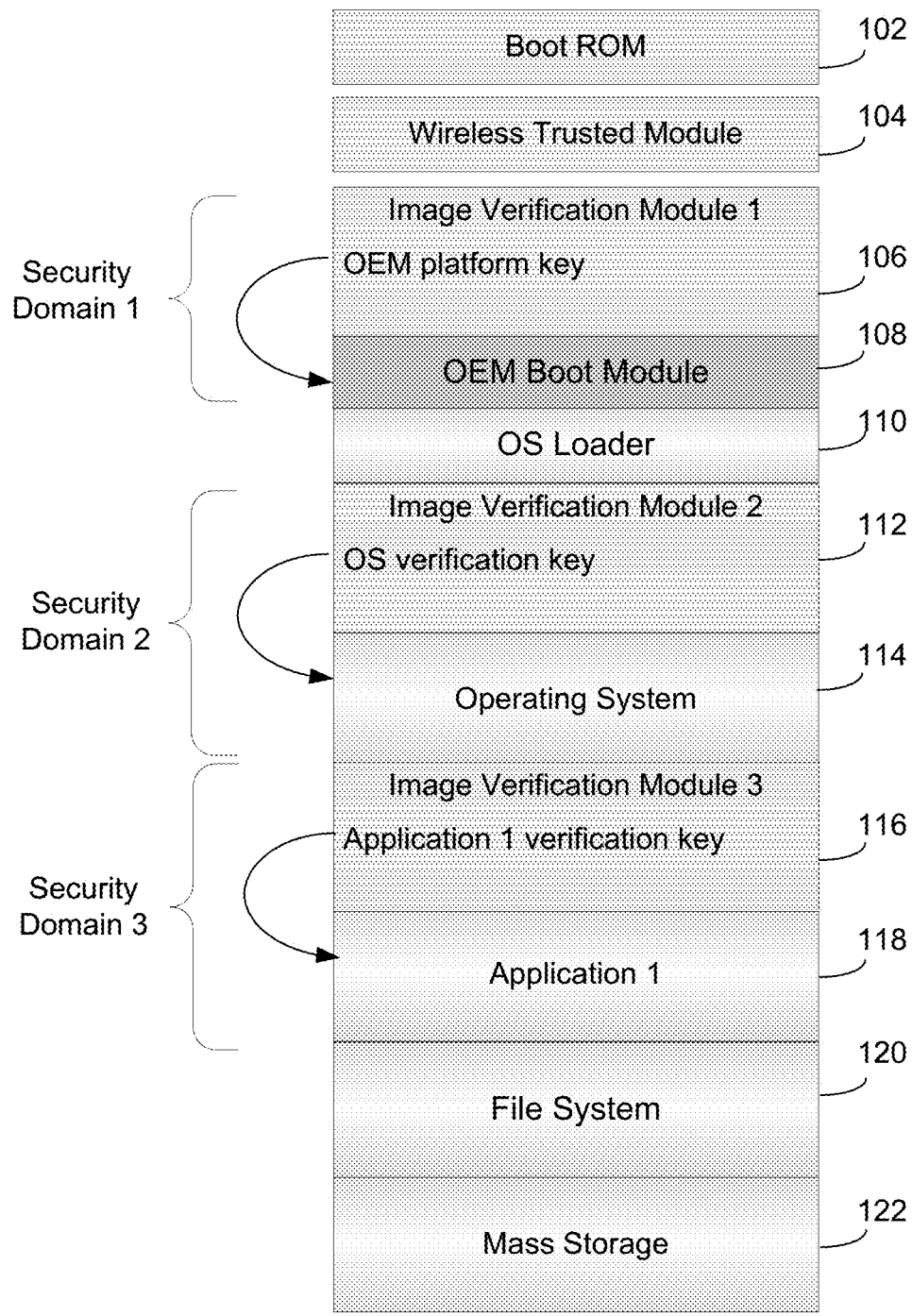
FIG. 1 is a memory image of a prior art electronic device.
Figure 2:
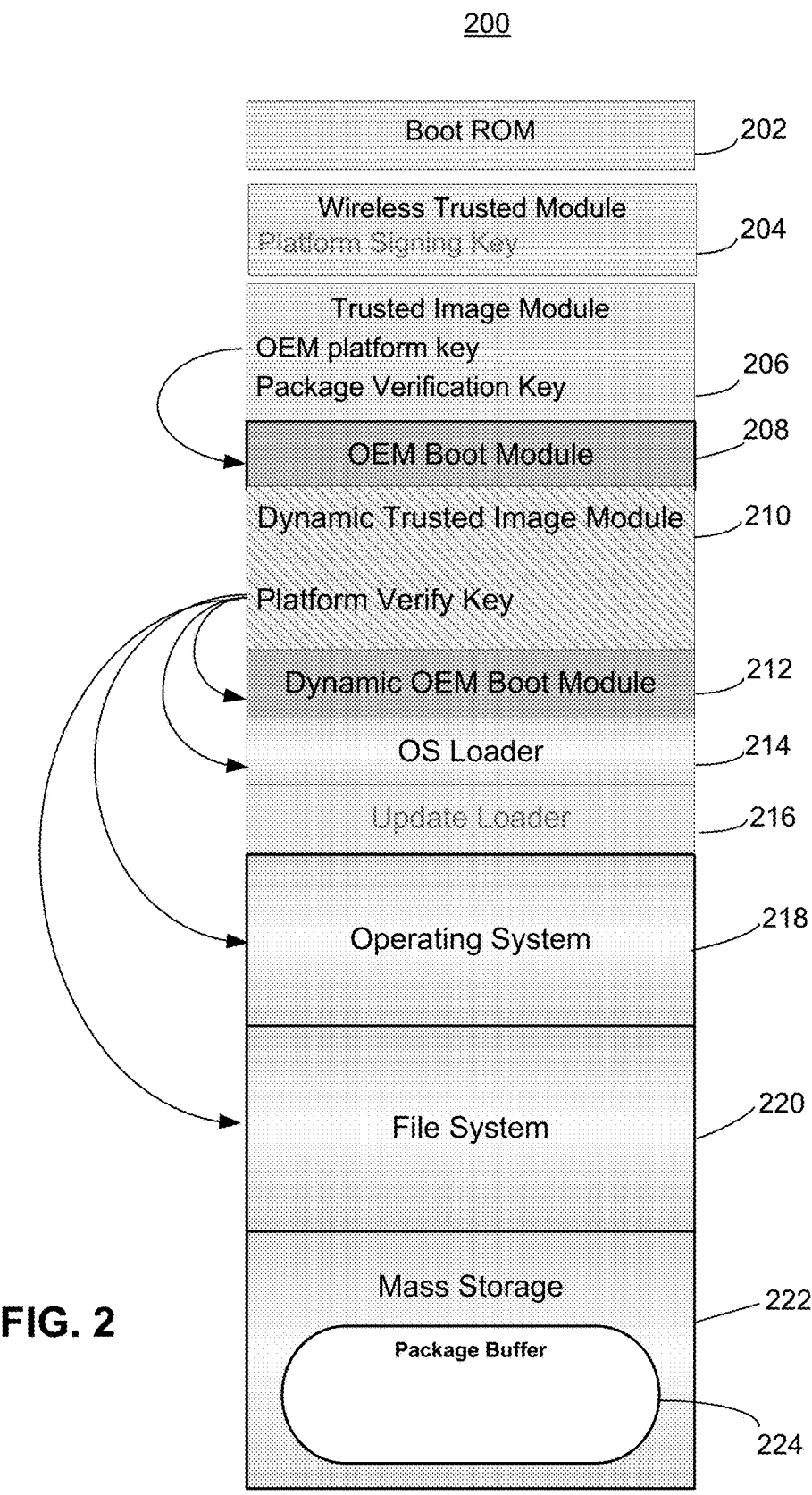
FIG. 2 is a memory image of an electronic device supporting trusted firmware update in a normal operating condition.

FIG. 2 is a memory image 200 of an electronic device supporting a trusted firmware update. The electronic device may be a communication device, a music player, a smart phone, a personal digital assistant, laptop computer, etc. In some cases the firmware update may be delivered via a wireless connection, but update via wired connection or removable media are equally applicable. The electronic device 200 may include a processor and memory supported by any number of bus structures, including, but not limited to, peripheral component interconnect (PCI), advanced technology attachment (ATA), serial peripheral interface (SPI), front-side bus (FSB), etc. The memory image 200 may be embodied in a combination of physical memory devices, both volatile and non-volatile, including random access memory, read-only memory, flash memory, rotating media, one-time programmable media, etc. FIGS. 7A-7F illustrate embodiments of exemplary electronic devices that may use trusted firmware update. For example, the cellular telephone 750 of FIG. 7C may use mass storage 764 and memory 766 to store configuration information, keys, and executable code modules, as described below. The processor 753 may run the executable code modules for both normal operation of the cellular telephone 750 and for performing a trusted firmware update.

When starting the electronic device, a boot program stored in boot read-only memory (ROM) 202 may be executed to support initial operations of the electronic device. The boot ROM 202 may be a permanently written memory in the electronic device and performs the same operations on each boot cycle. The boot ROM 202 may be a classic, manufactured ROM, a fuse-link memory, a one-time programmable memory, etc. The boot ROM 202 may be part of a wireless trusted module 204 that may be present in some embodiments of the electronic device. The boot ROM 202, the wireless trusted module 204, or another secure entity (not depicted), such as a smart chip, may also store a platform signing key, the function of which is explained below. The platform signing key may be generated on the electronic device or may be injected/installed in a secure manufacturing environment. The platform signing key is secured and may only be accessible during limited operation of the electronic device, as described below. The usage of the platform signing key is enabled by default after a reset, but once it's usage has been disabled, an additional reset will be required to enable it again. This is accomplished through the aid of security hardware such as the wireless trust module (not depicted). The platform signing key is the private part of an asymmetric, e.g. public key infrastructure (PKI), key pair.

In one embodiment, a trusted image module 206 may include a platform key and a package verification key. The platform key may be a public key corresponding to a private key held by the OEM or other trusted entity and may be bound to the electronic device for the lifetime of the product, to prevent unauthorized replacement. The platform key may be used to verify the boot module 208. The trusted image module 206 and the boot module 208 may be written during a manufacturing operation and may be fixed during the life of the electronic device. In one embodiment, the trusted image module 206 may be stored in the form of a digital certificate. A digital certificate, such as an X.509v3 certificate, can store keys and extension data in a common and well known format. Other formats or file structures may also be used to store the information and keys used to securely boot the electronic device.

During normal operation when no update is pending, the boot module 208 may verify and extract a dynamic trusted image module 210. The dynamic trusted image module 210 may also be stored in a certificate format, or some other suitable format, and may include both a platform verification key and information about other operational images used in the electronic device. A more detailed description of the dynamic trusted image module 210 is found below with respect to FIG. 5.

The platform verification key may be a public key portion of the platform signing key, referenced above, and may be used to validate one or more updateable images used in the electronic device. For example, a dynamic boot module 212, an operating system loader 214, an operating system 218, and the file system 220 may all be validated using information in the dynamic trusted image module 210. Application programs and other utilities may also be included, but are not shown in the embodiment of FIG. 2. Mass storage 222 may include a buffer area for downloading new packages for use in an update.

An update loader 216 may not be activated during normal operation, but may be reserved for use during an update, as discussed in more detail below.

Figure 3:
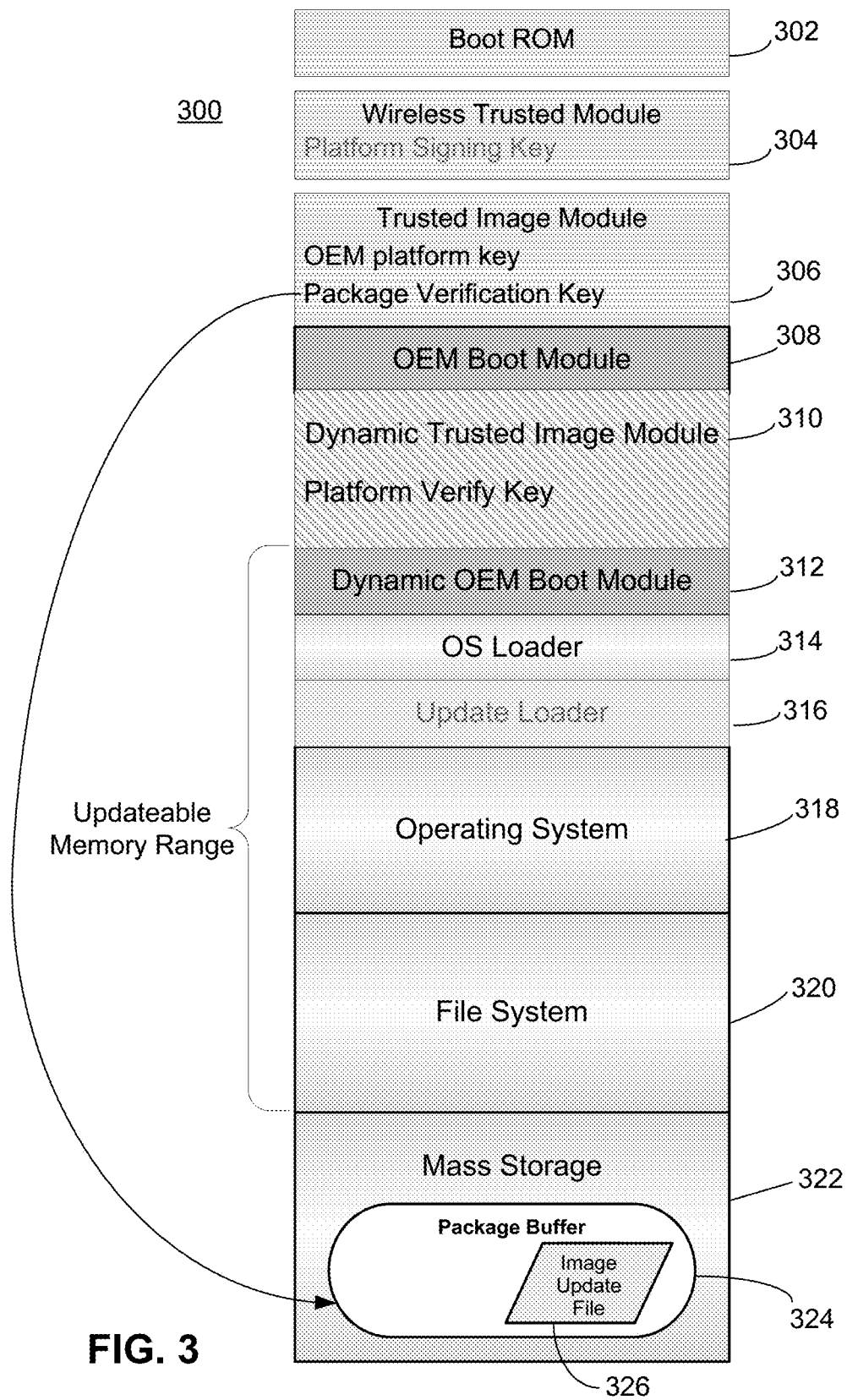
FIG. 3 is a memory image of an electronic device, similar to the memory image of FIG. 2, illustrating verification of an image update.

FIG. 3 illustrates a memory image 300 showing the presence of an update package 326, containing image update information, such as an image update file. As in FIG. 2, the memory image 300 illustrates a boot ROM 302, a wireless trusted module 304, a trusted image module 306, boot module 308, and dynamic trusted image module 310. A dynamic boot module 312, OS loader 314, update loader 316, and file system 320 may all be updated using a trusted firmware update process. The dynamic trusted image module 310 must also be changed during the update, but is generated locally and is not part of the image update file 326. As shown in FIG. 3, the image update file 326 may be stored in the package buffer 324 of the mass storage 322. The image update file may be a full image, a "delta" file representing changes to an existing image, or a combination of both.

The authenticity of the image update file 326 may be validated by the package verification key that is permanently stored in the trusted image module 306. The package verification key in the trusted image module 306 is a public key corresponding to a private key held by an authorized provider of updates. More than one package verification key may exist, either to support key rolling for security purposes or to support more than one source of updates.

After the image update file 326 has been authenticated, an "update pending" flag may be set and a reset performed, either immediately, at the convenience of a user, or after a period of time.

Figure 4:
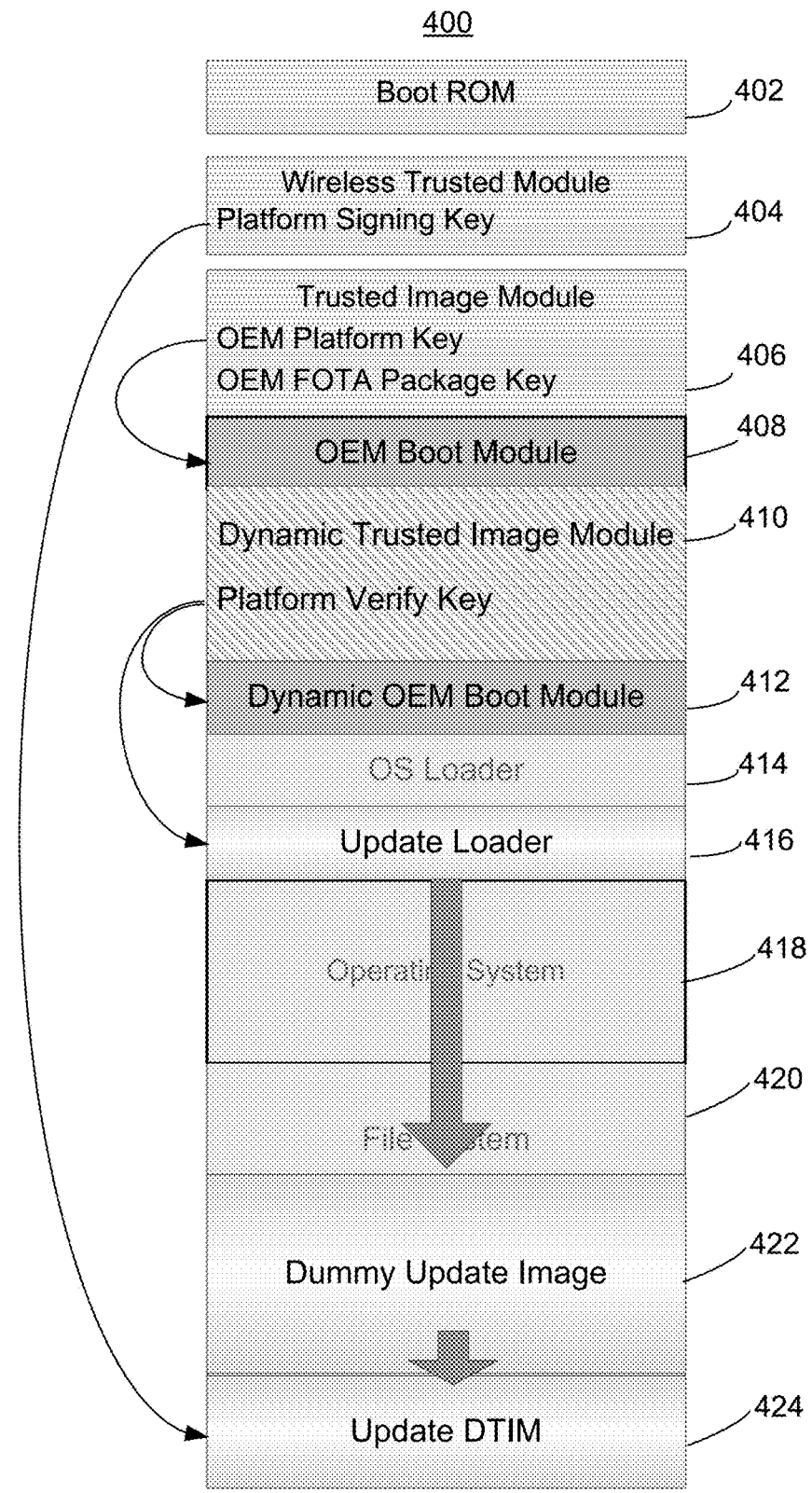
FIG. 4 is a memory image of an electronic device illustrating a trusted firmware update.

FIG. 4 illustrates a memory image 400 of an electronic device during a trusted firmware update. When booting, initial operation may be supported by the boot ROM 402 or first verification module, as described above. After a trusted image module 406 is extracted and verified from, in some embodiments a digital certificate, a boot module 408 or management module, may be verified and started. The boot module 408 may identify that an "update pending" flag is set and an alternate boot path may be activated. If an update is not required on this power cycle, a wireless trusted module 404 may deactivate the signing key for the remained of this power cycle.

The dynamic trusted image module 410 may be verified and loaded and the dynamic boot module 412, or second verification module, may be verified and executed. An update loader 416, or update manager module, may be activated instead of starting an OS loader 414, and the related OS 418 and file system 420.

The update loader 416 may take an image update file, such as the image update file 326 of FIG. 3, and create a dummy update image 422 in memory. The dummy update image 422 may be a duplicate of what the final updated image will be. After the dummy update image 422 is installed, attribute information may be extracted and the attribute information signed by the platform signing key 404. The signed attribute information may be formatted into a digital certificate format, creating an update dynamic trusted image module 424 corresponding to the dummy update image 422.

The update loader 416 may then overwrite the area or areas of memory affected by the update as well as overwriting the dynamic trusted image module 410 with the update 424. The two updates may be performed atomically, that is, performed so that if either update is unsuccessful, the other will be cancelled. Several techniques for atomic update are known to those of ordinary skill in the art. Several techniques for atomic updates are available. These techniques have been previously established and are available as stand-alone software from several vendors such as RedBend and Hewlett Packard.

Figure 5:
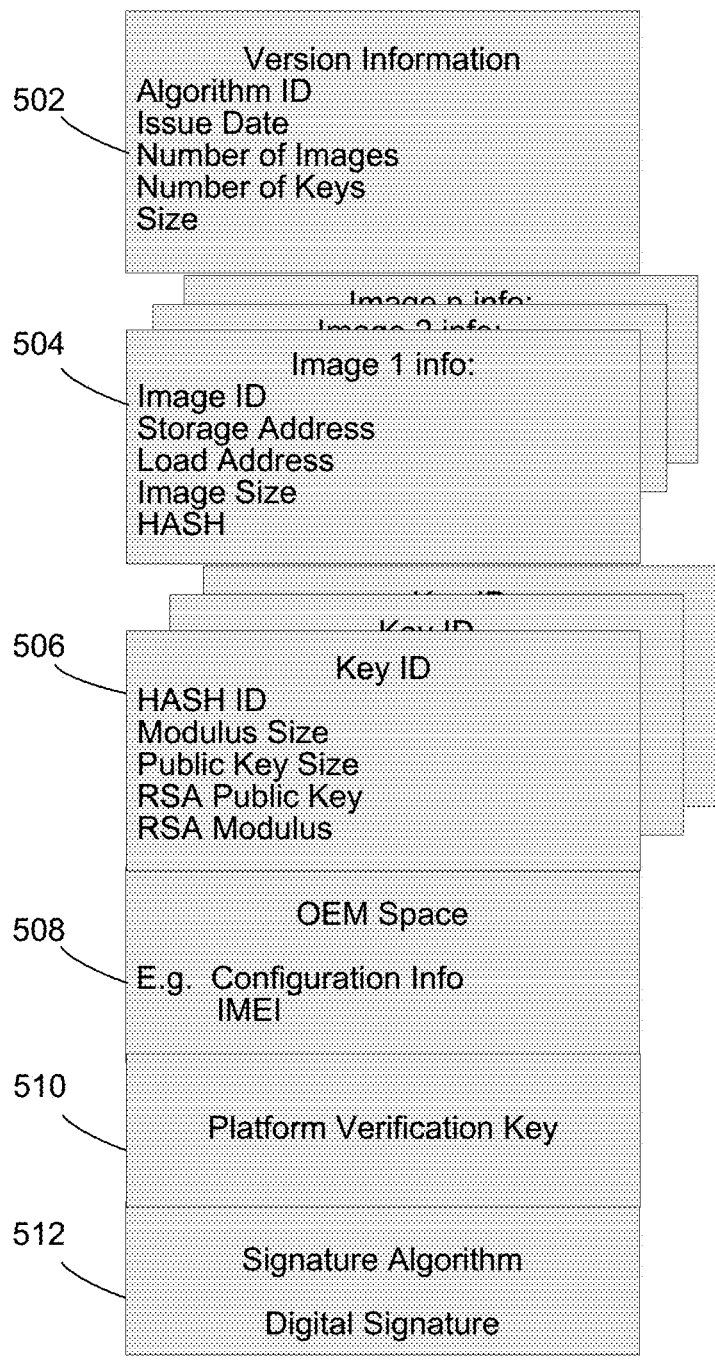
FIG. 5 is a digital certificate layout supporting trusted firmware updating.

FIG. 5 is an illustrative digital certificate 500 suitable for use in a trusted firmware download environment. The digital certificate 500 may be a digital certificate used to store trusted image information or a platform certificate used to store dynamic trusted image information, such as elements 306 and 310, respectively, of FIG. 3. The digital certificate 500 may include version information 502 that may include information found in a standard certificate, for example, an algorithm identifier specifying a cryptographic method used, an issue date/validity date, and size. In addition, the version information 502 may include references for the number of images and the number of keys stored in the certificate 500.

Image information 504 may include an image identifier, for example, a version number, a storage address indicating where in memory the image is stored, a load address indicating where the image should be installed for operation, image size, and a hash, which in most cases, is signed with a private key of a trusted party. Image information 504 may exist for each image covered by the digital certificate 500, such as a dynamic boot module 312, an OS loader 314, an update loader 316, an OS 318, file system 320, or other applications and utilities (not depicted).

Key identification information 506 may include an algorithm identifier specifying a public key scheme, a modulus size, a public key size, the key itself, and the modulus. In general, any suitable public/private key scheme can be used. The RSA Division of EMC is the source of the popular RSA algorithm. Elliptic curve is another public/private key scheme. Key identification information 506 may exist for each public key in use. For example, in some embodiments, an equipment manufacturer may store several keys and roll over usage at prescribed times to help improve security.

An OEM space 508 may be used when the manufacturer, or other interested party, has information they wish to add to the electronic device and include in the authentication process. For example, an International Mobile Equipment Identity (IMEI) or configuration information may also be included in the digital certificate 500.

A platform verification key 510 may be a public component of the signing key discussed above with respect to FIG. 4 and securely stored in a memory, such as in the wireless trusted module 404. The platform verification key 510 may be used to validate image elements when starting up the electronic device.

A signature algorithm block 512 may store information about how the digital certificate is signed and may also include the digital signature of the certificate. The digital signature may be a hash of the other information in the certificate, encrypted by the private key of the trusted entity generating the certificate. In the case of the trusted image module 306, it may be a manufacturer's private key, or in the case of the dynamic trusted image module 310, it may be the platform signing key stored in the electronic device itself, for example, the wireless trusted module 404.

Figure 6:
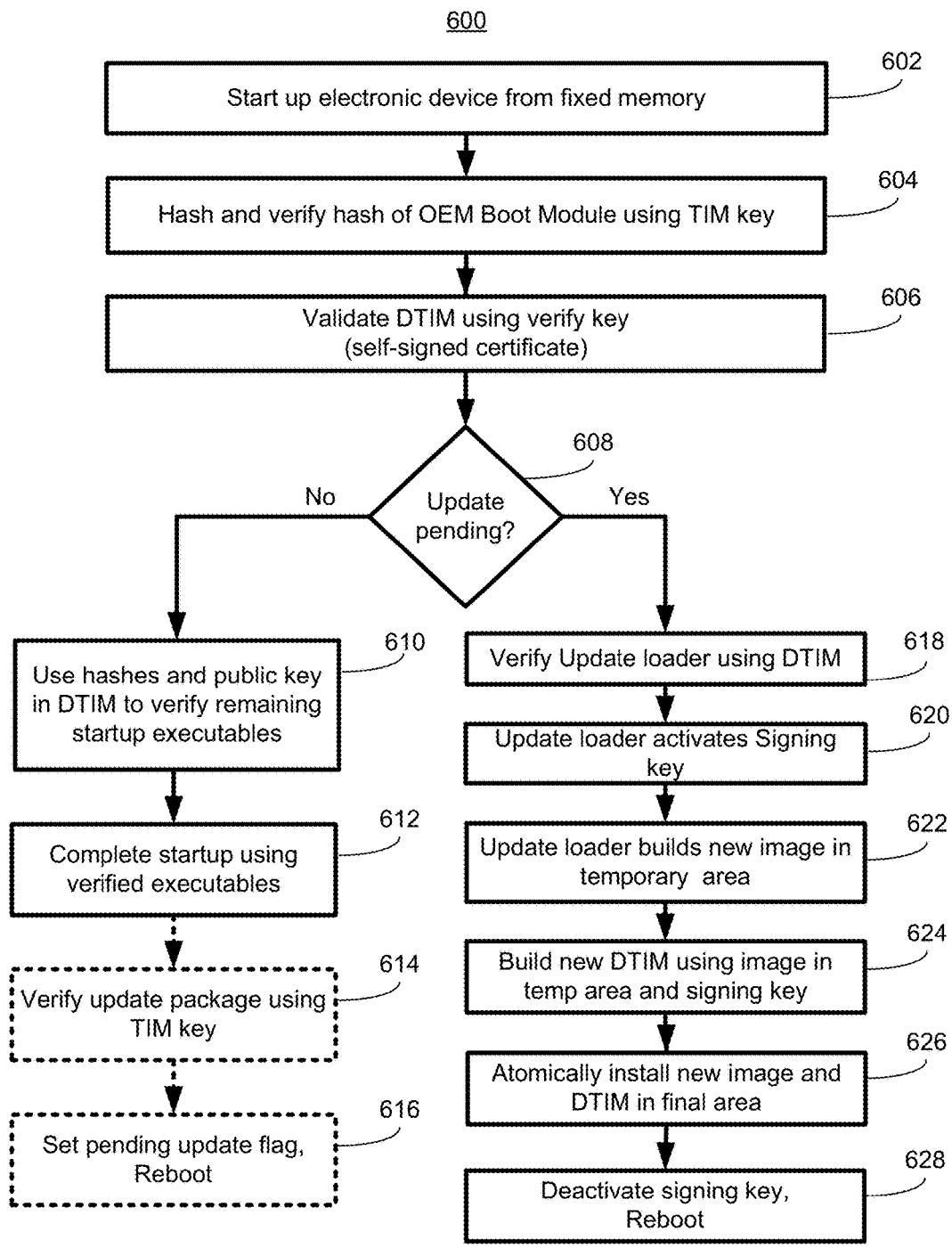
FIG. 6 is a method of performing a trusted firmware update.

FIG. 6 illustrates a flow diagram of an example method 600 of performing a trusted firmware update. At block 602, an electronic device may start up and begin operation using an initial boot program from a fixed memory, such as boot ROM 202 of FIG. 2.

At block 604, the initial boot program may hash an OEM boot module 208. The initial boot program may also extract an encrypted (i.e. signed) hash of an authorized OEM boot module and an appropriate platform key from a trusted image module (TIM) 206. The trusted image module is usually fixed at the time of manufacture and is not changeable. After verifying the signature of the signed hash of the known module and ensuring that the platform key has not been modified, the two hashes may be compared. If they match, processing may continue. If they do not match, the process may exit and, optionally, provide an error message to a user.

At block 606, a dynamic trusted image module (DTIM) 210 may be validated by verifying its own hash with a stored hash signed by a local private key, for example, a platform signing key. By building from a known trusted ROM-based startup program, and only activating subsequent programs after they are cryptographically verified, a trusted base of computing can be expanded, optionally, to include the full operating system and beyond.

At block 608, a determination may be made if an update is pending. If no update is pending, the 'no' branch from block 608 may be taken to block 609. At block 609, the platform signing key may be deactivated and execution continued at block 610.

At block 610, hash and key information in the dynamic trusted image module may be used to verify one or more subsequent programs associated with booting and operating the electronic device, including a dynamic boot module 212, an operating system loader 214, an operating system 218, a file system 220, etc. As described above with respect to FIG. 5, a signed hash for each image and one or more associated verification keys may be stored in digital certificate format in the dynamic trusted image module 210.

At block 612, the verified executables may be activated and the electronic device operated normally.

At block 614, an update package 326 may be received at the electronic device. The update may arrive over-the-air via a wireless connection, via removable media, or via a wired connection. A package verification key stored in the trusted image module 206 may be used to verify the update package 326.

At block 616, after verification of the update package 326, a pending update flag may be set for reference by the electronic device during the next reboot. Either immediately, or at the convenience of the user, or after a specified period, the electronic device may reboot and operation may continue as described above beginning at block 602 through block 608.

Referring again to block 608, if it is determined that an update is pending (e.g., the pending update flag is set), the 'yes' branch from block 608 may be taken to block 618.

At block 618, an update loader 216 may be verified using key and hash information in the dynamic trusted image module 210.

At block 620, if not already activated at block 606, the platform signing key stored in the wireless trusted module 404, or other secure location, may be activated by the dynamic OEM boot module 412. The dynamic OEM boot module 412 then hands control to the update loader 416. Because the platform signing key is not accessible after activation of the OS loader 414 or any subsequent programs of blocks 610-616, user programs may not subvert use of the platform signing key to install a rogue update.

At block 622, the update loader 216 may use the information in the update package to build one or more new images for use in the electronic device. To preserve the ability to recover from an error during the update process, a dummy copy of the updated image 422 may generated and stored in a memory location apart from the currently available executables (e.g. images 312-320), as depicted in FIG. 4. As discussed above, the update package may include changes only, complete images, or a combination of the two.

At block 624, a new dynamic trusted image module 424 may be built using image information of the dummy update 422. The new dynamic trusted image module 424 may be signed using the platform signing key, e.g. the private key corresponding to the platform verify key used by the dynamic trusted image module 410 and by the new dynamic trusted image module 422 after final installation. The new dynamic trusted image module 424 may be formatted into a digital certificate, as shown in FIG. 5.

At block 626, the updated image 422 and new dynamic trusted image module 424 may be atomically written to a final location, e.g. overwriting the current images.

At block 628, control is handed back to the dynamic OEM boot module 412. The signing key may be deactivated and the electronic device restarted to allow use of the new firmware.

FIGS. 7A-7F, illustrate various devices in which a trusted firmware update technique may be employed. In each of the illustrative embodiments, a boot ROM and trusted image module may be incorporated in a processing or control block. A dynamic trusted image memory may be included in a mass data storage device of each embodiment. Modules containing executable code, configuration data, keys, etc., may also be stored in the mass storage and executed by a processor, when present, or a controller/control system.

Figure 7A:
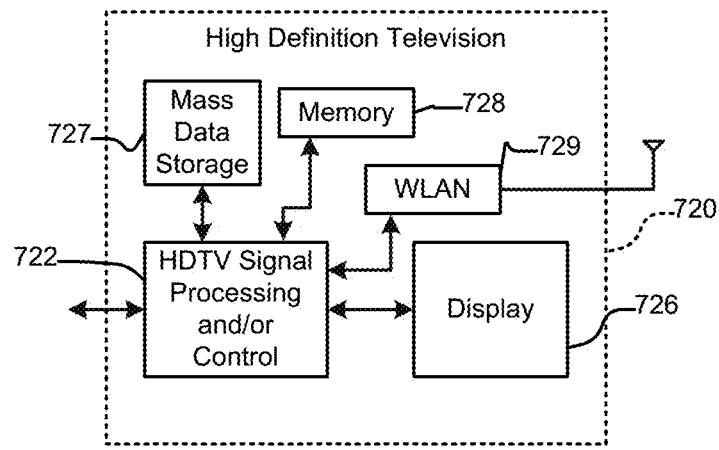
FIGS. 7A-7F illustrate embodiments of devices that may utilize a trusted firmware update.

Referring now to FIG. 7A, such techniques may be utilized in a high definition television (HDTV) 720. HDTV 720 includes a mass data storage 727, an HDTV signal processing and control block 722, a WLAN interface and memory 728. HDTV 720 receives HDTV input signals in either a wired or wireless format and generates HDTV output signals for a display 726. In some implementations, signal processing circuit and/or control circuit 722 and/or other circuits (not shown) of HDTV 720 may process data, perform coding and/or encryption, perform calculations, format data and/or perform any other type of HDTV processing that may be required.

HDTV 720 may communicate with a mass data storage 727 that stores data in a nonvolatile manner such as optical and/or magnetic storage devices. The mass storage device may be a mini HDD that includes one or more platters having a diameter that is smaller than approximately 1.8". HDTV 720 may be connected to memory 728 such as RAM, ROM, low latency nonvolatile memory such as flash memory and/or other suitable electronic data storage. HDTV 720 also may support connections with a WLAN via a WLAN network interface 729. Both the HDTV signal processor 722 and the WLAN network interface 729 may use a trusted firmware update.

Figure 7B:
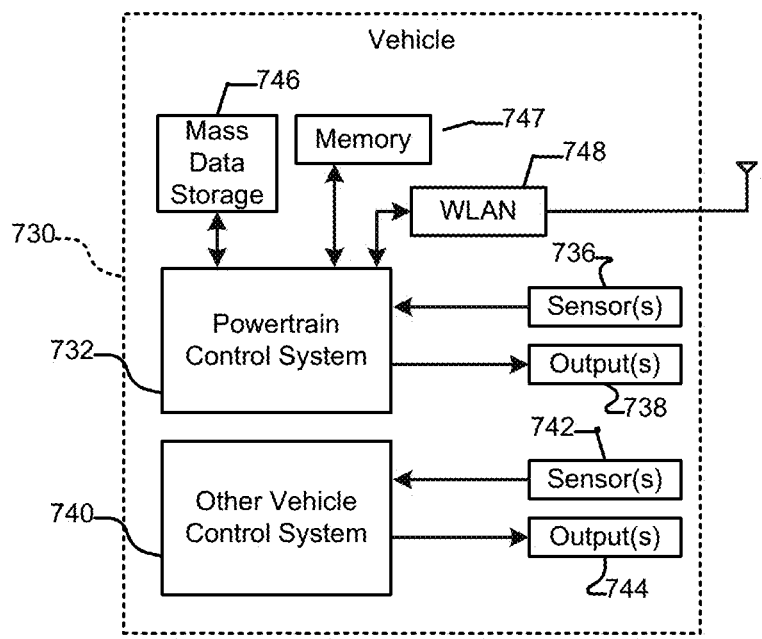

Referring now to FIG. 7B, such techniques may be utilized in a vehicle 730. The vehicle 730 includes a control system that may include mass data storage 746, as well as a WLAN interface 748. The mass data storage 746 may support a powertrain control system 732 that receives inputs from one or more sensors 736 such as temperature sensors, pressure sensors, rotational sensors, airflow sensors and/or any other suitable sensors and/or that generates one or more output control signals 738 such as engine operating parameters, transmission operating parameters, and/or other control signals.

Control system 740 may likewise receive signals from input sensors 742 and/or output control signals to one or more output devices 744. In some implementations, control system 740 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 732 may communicate with mass data storage 727 that stores data in a nonvolatile manner such as optical and/or magnetic storage devices. The mass storage device 746 may be a mini HDD that includes one or more platters having a diameter that is smaller than approximately 1.8". Powertrain control system 732 may be connected to memory 747 such as RAM, ROM, low latency nonvolatile memory such as flash memory and/or other suitable electronic data storage. Powertrain control system 732 also may support connections with a WLAN via a WLAN network interface 748. The control system 740 may also include mass data storage, memory and/or a WLAN interface (all not shown). In one exemplary embodiment, the WLAN network interface 748 may implement trusted firmware update.

Figure 7C:
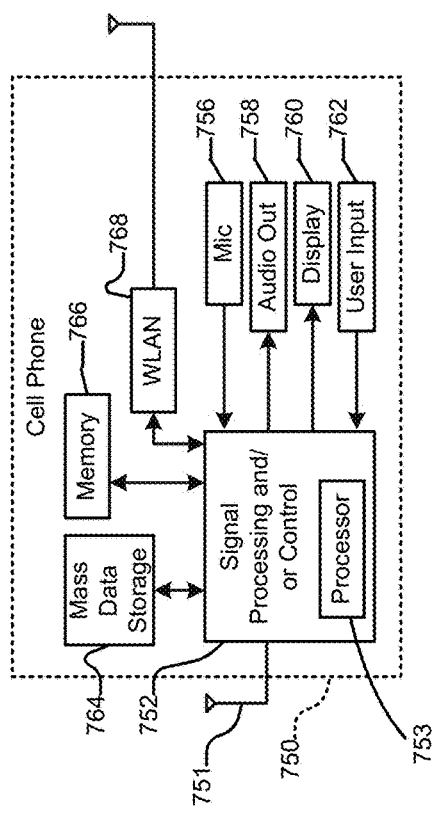

Referring now to FIG. 7C, such techniques may be used in a cellular phone 750 that may include a cellular antenna 751. The cellular phone 750 may include either or both signal processing and/or control circuits, which are generally identified in FIG. 7C at 752, a WLAN network interface 768 and/or mass data storage 764 of the cellular phone 750. In some implementations, cellular phone 750 includes a microphone 756, an audio output 758 such as a speaker and/or audio output jack, a display 760 and/or an input device 762 such as a keypad, pointing device, voice actuation and/or other input device. Signal processing and/or control circuits 752, that may include a processor 753 and/or other circuits (not shown) in cellular phone 750 may process data, perform coding and/or encryption, perform calculations, format data and/or perform other cellular phone functions. The signal processing and control circuits 752 may employ a trusted firmware update. The memory 766 may include both ROM and random access memory (RAM). Boot code and a trusted image module may be stored in the ROM. The signal processing and control block 752 may provide trusted, conditional access to a platform signing key when in an update mode. A dynamic trusted image module may be stored in the mass data storage 764, as well as a dynamic boot module, OS loader, operating system, etc., as required by the architecture and operation of the cellular phone 750.

Cellular phone 750 may communicate with mass data storage 764 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 750 may be connected to memory 766 such as RAM, ROM, low latency nonvolatile memory such as flash memory and/or other suitable electronic data storage. Cellular phone 750 also may support connections with a WLAN via a WLAN network interface 768 may implement a trusted firmware update.

Figure 7D:
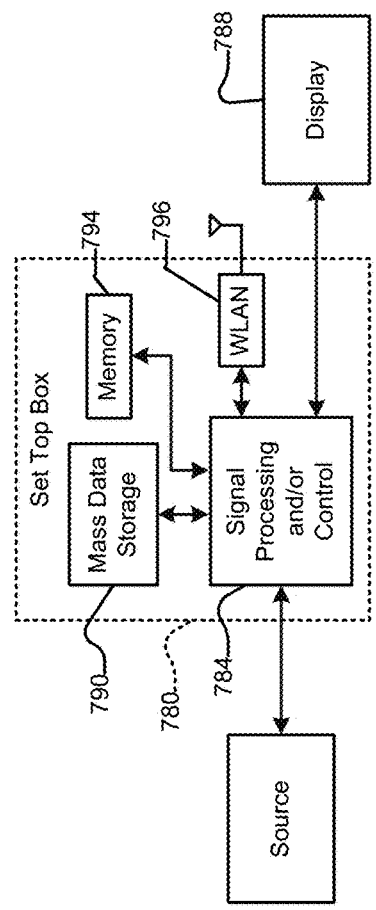

Referring now to FIG. 7D, such techniques may be utilized in a set top box 780. The set top box 780 may include either or both signal processing and/or control circuits, which are generally identified in FIG. 7D at 784, a WLAN interface and/or mass data storage 790 of the set top box 780. Set top box 780 receives signals from a source such as a broadband source and outputs standard and/or high definition audio/video signals suitable for a display 788 such as a television and/or monitor and/or other video and/or audio output devices. Signal processing and/or control circuits 784 and/or other circuits (not shown) of the set top box 780 may process data, perform coding and/or encryption, perform calculations, format data and/or perform any other set top box function. The signal processing and control circuits 784 may employ a trusted firmware update.

Set top box 780 may communicate with mass data storage 790 that stores data in a nonvolatile manner. Mass data storage 790 may include optical and/or magnetic storage devices for example hard disk drives HDD and/or DVDs. The HDD may be a mini HDD that includes one or more platters having a diameter that is smaller than approximately 1.8". Set top box 780 may be connected to memory 794 such as RAM, ROM, low latency nonvolatile memory such as flash memory and/or other suitable electronic data storage. Set top box 780 also may support connections with a WLAN via a WLAN network interface 796. The WLAN network interface 796 or the signal processor 784 may implement a trusted firmware update.

Figure 7E:
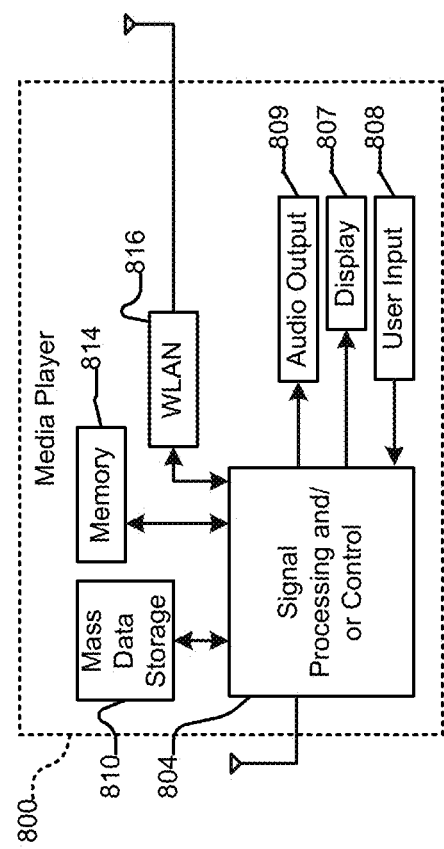

Referring now to FIG. 7E, such techniques may be used in a media player 800. The media player 800 may include either or both signal processing and/or control circuits, which are generally identified in FIG. 7E at 804, a WLAN interface and/or mass data storage 810 of the media player 800. In some implementations, media player 800 includes a display 807 and/or a user input 808 such as a keypad, touchpad and the like. In some implementations, media player 800 may employ a graphical user interface (GUI) that typically employs menus, drop down menus, icons and/or a point-and-click interface via display 807 and/or user input 808. Media player 800 further includes an audio output 809 such as a speaker and/or audio output jack. Signal processing and/or control circuits 804 and/or other circuits (not shown) of media player 800 may process data, perform coding and/or encryption, perform calculations, format data and/or perform any other media player function.

Media player 800 may communicate with mass data storage 810 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 800 may be connected to memory 814 such as RAM, ROM, low latency nonvolatile memory such as flash memory and/or other suitable electronic data storage. Media player 800 also may support connections with a WLAN via a WLAN network interface 816. The WLAN network interface 816 and/or signal processing circuits 804 may implement a trusted firmware update.

Figure 7F:
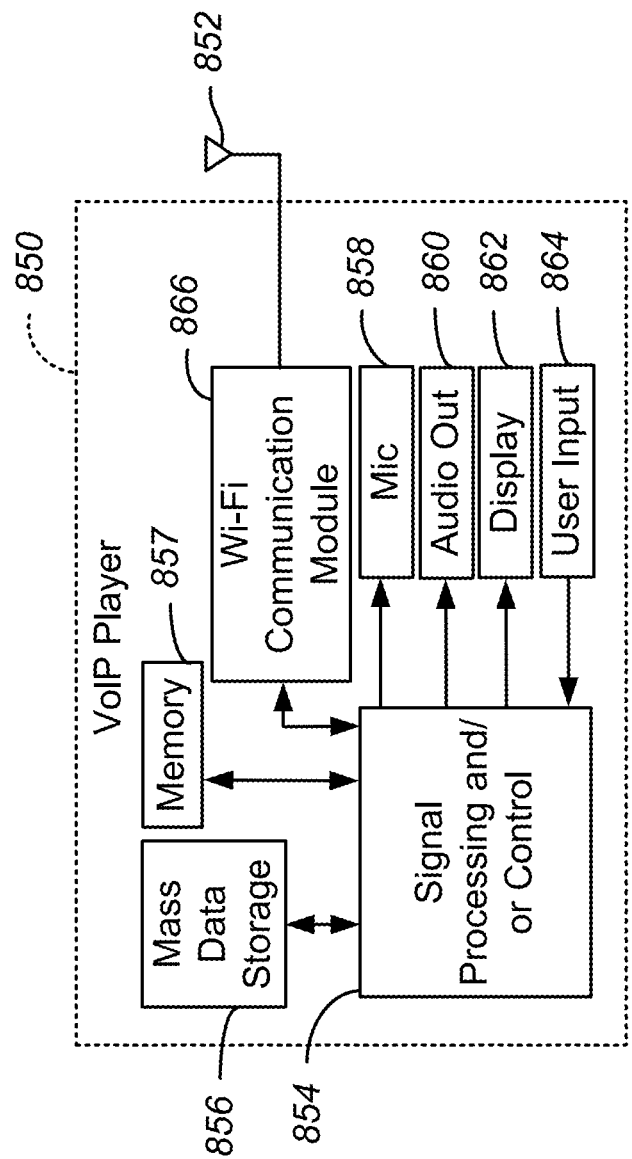

Referring to FIG. 7F, such techniques may be utilized in a Voice over Internet Protocol (VoIP) phone 850 that may include an antenna 852. The VoIP phone 850 may include either or both signal processing and/or control circuits, which are generally identified in FIG. 7F at 854, a wireless interface and/or mass data storage of the VoIP phone 850. In some implementations, VoIP phone 850 includes, in part, a microphone 858, an audio output 860 such as a speaker and/or audio output jack, a display monitor 862, an input device 864 such as a keypad, pointing device, voice actuation and/or other input devices, and a Wireless Fidelity (WiFi) communication module 866. Signal processing and/or control circuits 854 and/or other circuits (not shown) in VoIP phone 850 may process data, perform coding and/or encryption, perform calculations, format data and/or perform other VoIP phone functions.

VoIP phone 850 may communicate with mass data storage 856 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 850 may be connected to memory 857, which may be a RAM, ROM, low latency nonvolatile memory such as flash memory and/or other suitable electronic data storage. VoIP phone 850 is configured to establish communications link with a VoIP network (not shown) via WiFi communication module 866. The signal processing and/or control circuits 854 or the WiFi communication module 866 may implement a trusted firmware update.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. An electronic device arranged for secure download of a firmware update, the electronic device comprising:
    a boot memory;
    a hardware memory with a signing key stored in the hardware memory; and
    a processor configured to implement
        a fixed trusted module stored in non-updatable hardware memory, said fixed trusted module containing a digital certificate, wherein the digital certificate includes (i) a platform key and (ii) a package verification key, and
        an electronically updatable dynamic trusted image module containing a platform certificate signed by the signing key, wherein the platform certificate includes (i) a platform verification key, (ii) image information associated with one or more images covered by the platform certificate, (iii) key information associated with one or more public keys, and (iv) electronic device-specific data associated with the electronic device,
    wherein the platform verification key (i) is a public key portion of the signing key, and (ii) is used to validate at least one of
        a second boot module,
        an operating system loader,
        an operating system, or
        a file system.

2. The electronic device of claim 1, wherein the hardware memory programmed with the signing key is a one-time programmable memory.

3. The electronic device of claim 1, wherein the platform key is a public key associated with an original equipment manufacturer (OEM) signing key.

4. The electronic device of claim 1, wherein:
    the platform key is used to verify a first boot module; and
    the first boot module is used to verify the dynamic trusted image module.

5. The electronic device of claim 1, wherein the image information includes at least one of:
    version number information indicating a version of each of the one or more images;
    storage address information indicating where in memory each of the one or more images is stored;
    load address information indicating where each of the one or more images should be installed for operation; or
    size information indicating a size of each of the one or more images.

6. The electronic device of claim 1, wherein the key information includes an algorithm identifier specifying at least one of:
   one or more public key schemes associated with the one or more public keys;
   one or more modulus sizes associated with the one or more public keys;
   one or more sizes associated with the one or more public keys; or
   one or more moduli associated with the one or more public keys.

7. The electronic device of claim 1, wherein the electronic device-specific data includes an international mobile equipment identity (IMEI) of the electronic device.

8. An electronic device arranged for secure download of a firmware update, the electronic device comprising:
   a boot memory;
   a hardware memory with a signing key stored in the hardware memory; and
   a processor configured to implement
      a fixed trusted module stored in non-updatable hardware memory, said fixed trusted module containing a digital certificate, wherein the digital certificate includes (i) a platform key and (ii) a package verification key, and
      an electronically updatable dynamic trusted image module containing a platform certificate signed by the signing key, wherein the platform certificate includes (i) a platform verification key, (ii) image information associated with one or more images covered by the platform certificate, (iii) key information associated with one or more public keys, and (iv) electronic device-specific data associated with the electronic device; and
   an update loader that activates when an update is pending, wherein the update loader has exclusive access to the signing key.

9. The electronic device of claim 8, further comprising a random access memory, wherein the update loader uses an update image file to create an image of the update in the random access memory.

10. The electronic device of claim 9, wherein the update loader creates a new dynamic trusted image module in response to the creation of the image of the update.

11. The electronic device of claim 9, wherein the package verification key is used to validate authenticity of the image update file.

12. An electronic device arranged for secure download of a firmware update, the electronic device comprising:
   a boot memory;
   a hardware memory programmed with a signing key;
   a processor configured to implement
      a fixed trusted module stored in non-updateable hardware memory containing a digital certificate, wherein the digital certificate includes
         a platform key used to verify a first boot module, and
         a package verification key used to validate authenticity of an image update file, and
      an electronically updateable dynamic trusted image module containing a platform certificate signed by the signing key, wherein the platform certificate includes
         a platform verification key, wherein the platform verification key is a public portion of the signing key, and wherein the platform verification key is used to validate at least one of (i) a second boot module, (ii) an operating system loader, (iii) an operating system, or (iv) a file system,
         image information associated with one or more images,
         key information associated with one or more public keys, and
         electronic device-specific data associated with the electronic device; and
      an update loader that activates when an update is pending, wherein the update loader has exclusive access to the signing key.

13. The electronic device of claim 12, wherein the first boot module is used to verify the dynamic trusted image module.

14. The electronic device of claim 12, wherein:
   the image information includes at least one of
      version number information indicating a version of each of the one or more images,
      storage address information indicating where in memory each of the one or more images is stored,
      load address information indicating where each of the one or more images should be installed for operation, or
      size information indicating a size of each of the one or more images; and
   the key information includes an algorithm identifier specifying at least one of
      one or more public key schemes associated with the one or more public keys,
      one or more modulus sizes associated with the one or more public keys,
      one or more sizes associated with the one or more public keys, or
      one or more moduli associated with the one or more public keys.

15. The electronic device of claim 12, further comprising a random access memory, wherein the update loader uses an update image file to create an image of the update in the random access memory.

16. The electronic device of claim 12, wherein the update loader creates a new dynamic trusted image module in response to the creation of the image of the update.

17. The electronic device of claim 12, wherein the package verification key is used to validate authenticity of the image update file.

* * * * *